US012275625B2

(12) United States Patent
Schwab et al.

(10) Patent No.: US 12,275,625 B2
(45) Date of Patent: Apr. 15, 2025

(54) HYDRAULIC SYSTEM FOR AN INDUSTRIAL TRUCK

(71) Applicants: Linde Material Handling GmbH, Aschaffenburg (DE); STILL GmbH, Hamburg (DE)

(72) Inventors: Markus Schwab, Mölln (DE); Ulrich Knechtel, Erlenbach a. Main (DE)

(73) Assignees: Linde Material Handling GmbH, Aschaffenburg (DE); STILL GmbH, Hamburg (DE)

( * ) Notice: Subject to any disclaimer, the term of this patent is extended or adjusted under 35 U.S.C. 154(b) by 26 days.

(21) Appl. No.: 18/215,220

(22) Filed: Jun. 28, 2023

(65) Prior Publication Data

US 2024/0051806 A1 Feb. 15, 2024

(30) Foreign Application Priority Data

Aug. 9, 2022 (DE) ..................... 10 2022 120 009.4

(51) Int. Cl.
*B66F 9/22* (2006.01)
*B66F 9/075* (2006.01)
*F15B 11/04* (2006.01)

(52) U.S. Cl.
CPC .............. *B66F 9/22* (2013.01); *B66F 9/0755* (2013.01); *F15B 11/04* (2013.01); *F15B 2211/40515* (2013.01); *F15B 2211/4053* (2013.01); *F15B 2211/40584* (2013.01)

(58) Field of Classification Search
CPC ........... F15B 11/04; F15B 11/05; F15B 11/16; F15B 11/20; F15B 11/22; B66F 9/22
See application file for complete search history.

(56) References Cited

U.S. PATENT DOCUMENTS 4,593,791 A * 6/1986 Matthews ............... F15B 11/20 187/226
6,557,456 B2 * 5/2003 Norton ...................... B66F 9/22 92/85 B (Continued)

FOREIGN PATENT DOCUMENTS

DE 10021609 A1 11/2001
DE 102016103256 A1 6/2017

(Continued)

*Primary Examiner* — Michael Leslie
(74) *Attorney, Agent, or Firm* — The Webb Law Firm

(57) ABSTRACT

A hydraulic system for an industrial truck with a lifting frame has at least one telescoping mast that can be raised and lowered in a stationary mast and a load handling means that can be raised and lowered in the telescoping mast. The hydraulic system has a free lift cylinder for raising and lowering the load handling means and at least one mast lift cylinder for raising and lowering the telescoping mast. A control valve device is provided for the control of the lifting operation and the lowering operation of the free lift cylinder and of the mast lift cylinders. A mast transition damping device is provided that includes at least one electrically actuated proportional valve. The proportional valve of the mast transition damping device, in the unactuated state, has a throttling connection that effects a throttled volume flow, and in the event of an electrical control action, can be actuated toward an open position.

14 Claims, 4 Drawing Sheets

(56) References Cited

U.S. PATENT DOCUMENTS

| | | | | |
|---|---|---|---|---|
| 7,240,771 | B2 * | 7/2007 | Perkins | B66F 9/22<br>187/229 |
| 10,844,879 | B2 * | 11/2020 | Ueda | F15B 13/01 |
| 11,427,451 | B2 * | 8/2022 | Stolten | B66F 9/22 |

FOREIGN PATENT DOCUMENTS

| | | | |
|---|---|---|---|
| DE | 102018119347 | A1 | 2/2020 |
| EP | 0546300 | A1 | 6/1993 |

* cited by examiner

HYDRAULIC SYSTEM FOR AN INDUSTRIAL TRUCK

CROSS-REFERENCE TO RELATED APPLICATION

This application claims priority to German Patent Application No. 10 2022 120 009.4 filed Aug. 9, 2022, the disclosure of which is hereby incorporated by reference in its entirety.

BACKGROUND OF THE INVENTION

Field of the Invention

The invention relates to a hydraulic system for an industrial truck with a lifting frame that has at least one telescoping mast that can be raised and lowered in a stationary mast, and a load handling means that can be raised and lowered in the telescoping mast. The hydraulic system has a free lift cylinder for raising and lowering the load handling means and at least one mast lift cylinder for raising and lowering the telescoping mast. A control valve device is provided for the control of the lifting operation and the lowering operation of the free lift cylinder and of the mast lift cylinder, and a mast transition damping device is provided that comprises at least one electrically actuated proportional valve.

Description of Related Art

On industrial trucks with a multi-lift frame that comprises a stationary mast and at least one telescoping mast, it is known that a free lift can be provided for the load handling means that can be raised and lowered in the telescoping mast. With the free lift, the load handling means can be raised in the telescoping mast without raising the telescoping mast. For this purpose, on lifting frames of the prior art, a free lift cylinder is provided by means of which the load handling means can be raised and lowered in the telescoping mast, and a mast lift cylinder is provided by means of which the telescoping mast can be raised and lowered in a stationary mast of the lifting frame. The mast lift cylinder provides a mast lift in which the telescoping mast is raised and lowered in the stationary mast.

On account of the use of a free lift cylinder and the mast lifting cylinder, discontinuities occur at the transition from the free lift into the mast lift and vice versa, which result in stresses on the components of the lifting frame and a load being carried.

To improve the transition from the free lift into the mast lift and vice versa, it is already known that a mast transition damping device can be provided that comprises at least one electrically actuated proportional valve. A generic hydraulic system with a mast transition damping device that comprises at least one electrically actuated proportional valve is known from FIG. 3a of DE 10 2016 103 256 A1.

With the at least one electrically actuated proportional valve, the lifting speed or the lowering speed of the free lift cylinder or of the mast lift cylinder can be controlled in the range of the transition between free lift and mast lift so that it becomes possible to transition from free lift to mast lift and vice versa practically smoothly, with no discontinuities, and an almost uniform lifting speed or lowering sped is achieved in the range of the transition between free lift and mast lift.

On the mast transition damping device known from FIG. 3a in DE 10 2016 103 256 A1, the electrically actuated proportional valves of the mast transition damping device have a normal position in the form of a closed position in the unactuated, i.e. de-energized state, in which no pressure medium can flow out of the free lift cylinder or the mast lift cylinder. If, on a mast transition damping device of this type, during a lowering operation and the descent of a load, such as at the nominal load, for example, a fault scenario occurs in the proportional valves of the mast transition damping device, the proportional valves are abruptly actuated into the normal position, which is the closed position, in which the connection of the free lift cylinder and the mast lift cylinder with the reservoir is cut off. A fault scenario of this type of the electrically actuated proportional valves can result in the event of a loss of electric energy, for example, on account of a power failure of the electric control signal of the proportional valves and/or a detachment of the plug of an electrical cable that is connected with an electrical actuator device of the corresponding proportional valve. As a result of the abrupt actuation of the directional control valve device into the closed position in the event of a fault scenario of the proportional valves, the load on the load handling means is abruptly brought to a halt, and depending on the previous speed of descent of the load handling means and the weight of the load on the load handling means, a pulse in the form of a pressure peak is introduced into the lifting frame. In particular at high speeds of descent of the load handling means in the range of greater than 1 m/s, such as 1.2 m/s, for example, in the event of a fault scenario of this type, for example, in the event of the detachment of the plug of an electrical cable that is connected with the electrical actuator device of the corresponding proportional valve, as the load handling means descend, a pulse in the form of a peak pressure is introduced into the lifting frame, which can result in damage to the mechanical structure of the lifting frame and can have an effect on the tipping stability of the industrial truck. Furthermore, after a fault scenario of the type described above, as a result of which the proportional valves of the mast transition damping device were actuated into the normal position which is the closed position, i.e. in the de-energized state of the hydraulic system, the further descent of the load is no longer possible.

SUMMARY OF THE INVENTION

The object of this invention is to provide a hydraulic control system and an industrial truck with a hydraulic control system which is improved with regard to the above mentioned disadvantages.

This object is accomplished by the invention in that the proportional valve of the mast transition damping device, in the unactuated state, has a throttling connection that effects a throttled volume flow, and which can be actuated toward an open position by an electrical control action.

According to the invention, therefore, the proportional valves of the mast transition damping device in the unactuated state, i.e. in the de-energized state, each make possible a throttled connection with which a throttled volume flow can flow out of the free lift cylinder or the mast lift cylinder. If, with the proportional valves of the mast transition damping device according to the invention, a fault scenario of the electrically actuated proportional valves occurs with a loss of electrical energy, for example, on account of a power failure of the electrical control signal of the proportional valves and/or a detachment of the plug of an electrical cable which is connected with an electrical actuator device of the corresponding proportional valve, a throttled volume flow can, therefore, flow out of the free lift cylinder or the mast lift cylinder via the throttle connection, as a result of which an abrupt stopping of the lifting or lowering movement of the load is prevented, and damage to the mechanical structure of the lifting frame can be prevented in a simple manner and the tipping stability of the industrial truck is improved. In addition, in the deenergized state of the hydraulic system it is also possible to continue lowering the load because, by means of the throttling connection in the unactuated, i.e. in the deenergized state of the proportional valves, pressure medium can flow out of the free lift cylinder and the mast lift cylinder.

According to one advantageous embodiment of the invention, in particular the proportional valve in the unactuated state is actuated into a normal position, which is provided with the throttling connection. The normal position is, therefore, realized as a throttling position. The proportional valve of the mast transition damping device is, therefore, in the form of an electrically actuated proportional throttle valve. With a de-energized normal position of the proportional valve of the mast transition damping device having a throttling connection, it is easily possible, in the unactuated, de-energized state of the proportional valve, to allow a throttled volume flow to flow out of the free lift cylinder or the mast lift cylinder.

According to one advantageous embodiment of the invention, in particular the proportional valve in the normal position is provided with a throttling opening, in particular a throttling boring. With a throttling opening in the form of a throttling boring, for example, in the normal position of the proportional valve, a throttling connection can be established in a simple manner, by means of which, in the unactuated, de-energized state of the proportional valve, a throttled volume flow can flow out of the free lift cylinder or the mast lift cylinder.

According to one alternative and likewise advantageous embodiment of the invention, in particular the proportional valve is located in a housing, wherein the proportional valve, in the unactuated state, is actuated into a normal position, which is a closed position, and the throttling connection is formed by a bypass line in which a throttling device is located is formed in the housing of the proportional valve. With a throttling connection that is formed by a bypass line formed in the housing of the proportional valve, wherein a throttling device is located in the bypass line, in connection with a proportional valve, the normal position of which is a closed position, it becomes possible in a simple manner, in the unactuated, de-energized state of the proportional valve, to achieve a throttled volume flow out of the free lift cylinder or the mast lift cylinder.

According to one advantageous embodiment of the invention, in particular the free lift cylinder is connected with the control valve device by means of a first branch line, and the at least one mast lift cylinder is connected with the control valve device by means of a second branch line, wherein there is a first proportional valve of the mast transition damping device in the first branch line and a second proportional valve of the mast transition damping device in the second branch line. In a hydraulic system with a free lift cylinder and one or more mast lift cylinders, with two such proportional valves, it is possible in a simple manner, during a lifting operation, by controlling the proportional valve located in the first branch line before the end of the free lift of the free lift cylinder, to reduce the pressure medium flow into the free lift cylinder and to initiate the pressure medium flow into the mast lift cylinder by increasing the pressure, and during a lowering operation, by controlling the proportional valve located in the second branch line before the end of the mast lift of the mast lift cylinder, to reduce the pressure medium flow out of the mast lift cylinder and to initiate the pressure medium flow out of the free lift cylinder by reducing the pressure, so that a smooth transition between the free lift and mast lift of the lifting frame can be achieved with no loss of speed and with little additional construction effort and expense.

According to one advantageous embodiment of the invention, in particular on the first proportional valve there is a bypass line in which is located a stop valve, in particular a non-return valve that opens toward the control valve device. With a stop valve of this type, it becomes possible, in lowering operation, at the transition from the mast lift into the free lift, for pressure medium to flow out of the free lift cylinder without having to drive the proportional valve located in the first branch line.

According to one advantageous embodiment of the invention, in particular on the second proportional valve, there is a bypass line in which there is a stop valve, in particular a check valve, that opens toward the at least one mast lift cylinder. With a stop valve of this type, it becomes possible during lifting operation, at the transition from the free lift into the mast lift, to allow pressure medium to flow into the mast lift cylinder without having to drive the proportional valve located in the second branch line.

According to one advantageous embodiment of the invention there is a mechanical line break safety device, in particular on each mast lift cylinder. The mechanical line break safety device comprises in particular a stop valve that opens toward the mast lift cylinder, for example, a non-return valve, and a bypass line with a throttle device located in the bypass line. With a line break safety device of this type on each mast lift cylinder, it becomes possible in a simple manner, in the event of a fault scenario, to limit the speed of descent of the mast lifting cylinder to permissible values.

According to one advantageous embodiment of the invention there is a mechanical line break safety device, in particular on the free lift cylinder. The mechanical line break safety device comprises in particular a stop valve that opens toward the free lift cylinder, for example, a non-return valve and a bypass line with a throttle device located in the bypass line. With a line break safety device of this type on the free lift cylinder, it becomes possible in a simple manner to limit the speed of descent of the free lift cylinder to permissible values in the event of a fault scenario.

According to one advantageous embodiment of the invention, in particular the first proportional valve is attached to the free lift cylinder and has the function of an electrical line break safety device. As a result of the attachment of the first proportional valve according to the invention to the free lift cylinder, it is possible in a simple manner with the first proportional valve to achieve the function of mast transition damping and the function of an electrical line break safety device, because the first proportional valve attached to the free lift cylinder, in the de-energized state, can assume the function of a line break safety device in a simple manner via the throttling device, and the speed of descent of the free lift cylinder can be limited to permissible values.

According to an alternative and likewise advantageous embodiment of the invention, in particular the free lift cylinder is connected by means of a first branch line with the control valve device and each mast lift cylinder is connected by means of a second branch line with the control valve device, wherein a proportional valve of the mast transition damping device is located in each branch line. In a hydraulic system with a free lift cylinder and in particular at least two mast lift cylinders, with proportional valves of the type described above, wherein a proportional valve is associated with each lift cylinder, it is easily possible during lifting operation, before the end of a free lift of the free lift cylinder, by driving the proportional valve located in the branch line of the free lift cylinder, to reduce the flow of pressure medium into the free lift cylinder, and the pressure medium flow into the mast lift cylinder is initiated by an increase in pressure, and during lowering operation, before the end of a mast lift of the mast lift cylinder, by driving the proportional valves located in the branch lines of the mast lift cylinder, to reduce the flow of pressure medium out of the mast lifts cylinders and to initiate the pressure medium flow out of the free lift cylinder by reducing the pressure so that a smooth transition between free lift and mast lift of the lifting frame can be achieved with no loss of speed and with little additional construction effort or expense.

According to one advantageous embodiment of the invention, for this purpose a proportional valve is attached in particular to the free lift cylinder and/or a proportional valve is attached to each mast lift cylinder, wherein the proportional valves each have the function of an electrical line break safety device. In a hydraulic system in which a proportional valve is located in each branch line leading to a lift cylinder, and, therefore, a proportional valve is associated with each lift cylinder, by attaching the corresponding proportional valves to the free lift cylinder and/or to the mast lift cylinders, it becomes easily possible with the proportional valves to achieve the function of mast transition damping and the function of electrical line break safety devices, because the proportional valve attached to the corresponding lift cylinder, in the deenergized state, as a result of the throttling connection, can easily assume the function of a line break safety device, and the speed of descent of the corresponding lift cylinder can be limited to permissible values.

The invention further relates to an industrial truck with a hydraulic system according to the invention.

The invention has a series of advantages.

With the proportional valves of the mast transition damping device according to the invention, the mast transition between free lift and mast lift can take place without reducing the speed during both lifting operations and lowering operations of the load handling means, as a result of which a high handling capacity of the industrial truck can be achieved.

With the proportional valves of the mast transition damping device according to the invention, the full mechanical stroke of the free lift cylinder and that of the mast lift cylinder can be utilized.

In the event of a loss of energy, for example, as a result of the detachment of a plug, the movement of the load handling means is not abruptly halted on account of the throttling connection of the proportional valves of the mast transition damping device. This results in reduced stress on the lifting frame and a reduced danger of tipping of the industrial truck.

In the event of an energy loss, for example, as a result of the detachment of a plug, on account of the throttling connection of the proportional valves of the mast transition damping device, an emergency lowering of the load is possible, for example, with the aid of a suitable device on the control valve device.

When the proportional valves of the mast transition damping device are in the form of an electrical line break safety device, in the event of a fault scenario the proportional valves can be brought into the normal position by means of a timed movement (ramp). An abrupt reduction in the speed of the load is thereby prevented.

When the proportional valves of the mast transition damping device are in the form of an electrical line break safety device, the proportional valves of the mast transition damping device, in the unactuated, de-energized state, are always in the normal position and, therefore, the line break safety device is always engaged or active. This provides an elevated degree of safety of the industrial truck.

With the proportional valves of the mast transition damping device according to the invention, it further becomes possible to realize the free lift cylinder with a smaller piston diameter, as a result of which a higher speed becomes possible during lifting and lowering.

BRIEF DESCRIPTION OF THE DRAWINGS

Additional advantages and details of the invention are described in greater detail below with reference to the exemplary embodiments illustrated in the accompanying schematic figures, in which.

DESCRIPTION OF THE INVENTION

Figure 1:
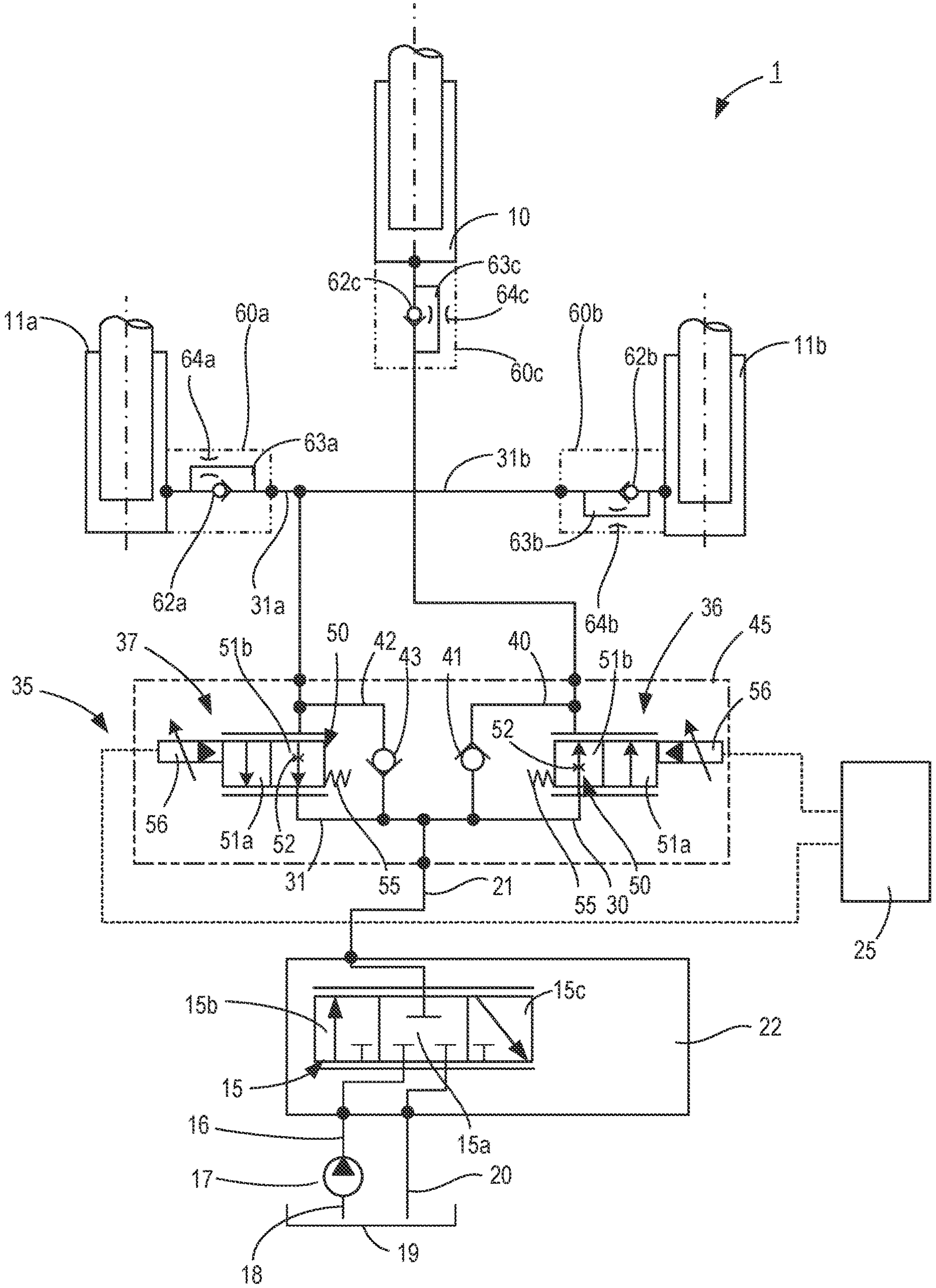
FIG. 1 is a schematic circuit diagram of a first embodiment of a hydraulic system according to the invention.

FIGS. 1 to 4 each show a schematic construction of a hydraulic system 1 of an industrial truck which is not illustrated in any further detail. Identical components are identified by identical reference numbers.

The industrial truck has a lifting frame which is not illustrated in any further detail, on which a load handling means or device is located so that it can be raised and lowered. The load handling means consist in particular of a lifting carriage that can move vertically on a lifting frame, to which is fastened, for example, a load fork formed by fork tines as an accessory device.

The lifting frame consists in particular of a stationary mast and at least one telescoping mast located so that it can be raised and lowered on the stationary mast, with load holding means located on the telescoping mast so that it can be raised and lowered.

The lifting frame has at least two lifting stages. The hydraulic system has a free lift cylinder 10 to raise and lower the load holding means relative to the telescoping mast. The free lift cylinder 10 forms a first lifting stage (free lift). For the raising and lowering of the load handling means, in particular flexible traction means or device which are not illustrated any further detail, for example, a lifting chain, are provided, which are fastened with a first end to the lifting carriage, are guided over a deflector roller on the telescoping piston rod of the free lift cylinder 10 and fastened with a second end to the telescoping mast. For raising and lowering the telescoping mast relative to the stationary mast, the hydraulic system 1 has at least one mast lift cylinder 11*a*, 11*b*. The mast lift cylinder 11*a*, 11*b* forms a second lifting stage (mast lift). In the illustrated exemplary embodiments, two mast lifting cylinders 11*a*, 11*b* are provided.

A control valve device 15 is provided for the control of the lifting and lowering operation of the free lift cylinder 10 and of the mast lift cylinders 11*a*, 11*b*.

The control valve device 15 in the illustrated exemplary embodiments is in the form of a proportional valve that throttles in intermediate positions, with a closed position 15*a* in the form of a normal position, a lifting position 15*b*, and a lowering position 15*c*. For this purpose, the control valve device 15 is connected to a delivery line 16 of a pump 17, which by a suction line 18 sucks pressure medium out of a reservoir 19 to a reservoir line 20 that leads to the reservoir 19, and to a consumer line 21 which is connected with the free lift cylinder 10 and the mast lift cylinders 11*a*, 11*b*.

In the closed position 15*a* of the control valve device 15, the connection of the consumer line 21 with the delivery line 16 and the reservoir line 20 is closed. In the lifting position 15*b* of the control valve device 15, the delivery line 16 is connected with the consumer line 21. In the lowering position 15*c* of the control valve device 15, the consumer line 21 is connected with the reservoir line 20.

In the illustrated exemplary embodiments the control valve device 15 is located on a multi-way control valve block 22.

The control valve device 15 can, for example, be actuated electrically by an electronic control device 25.

Alternatively, the control valve device 15 can have a separate lifting valve to control the lifting operation of the load handling means and a separate lowering valve to control the lowering operation of the load handling means.

The free lift cylinder 10 and the mast lift cylinders 11*a*, 11*b* in FIGS. 1 to 4 are realized in such a way that during lifting operations of the load handling means, first the free lift cylinder 10 is extended and then the mast lift cylinders 11*a*, 11*b* are extended, and during lowering operations of the load handling means, first the mast lift cylinders 11*a*, 11*b* are retracted and then the free lift cylinder 10 is retracted.

The hydraulic system 1 in FIGS. 1 to 4 also has a mast transition damping device 35 that comprises at least one electrically actuated proportional valve.

In FIG. 1, the free lift cylinder 10 is connected with the control valve device 15 by a first branch line 30 branching off the consumer line 21, and the at least one mast lift cylinder 11*a*, 11*b* is connected with the control valve device 15 by a second branch line 31 branching off the consumer line 21. The branch line 31 is in connection by a first connecting line 31*a* with the mast lift cylinder 11*a* and by a first connecting line 31*b* with the mast lift cylinder 11*b*.

In FIG. 1, the mast transition damping device 35 has two electrically actuatable, first and second, proportional valves 36, 37, wherein the first proportional valve 36 is located in the first branch line 30 and the second proportional valve 37 is located in the second branch line 31. Located on the first proportional valve 36 is a bypass line 40, in which there is a stop valve 41, in particular a non-return valve, which opens toward the control valve device 15.

Located on the second proportional valve 37 is a bypass line 42, in which there is a stop valve 43, in particular a non-return valve, which opens toward the mast lift cylinders 11*a*, 11*b*.

In FIG. 1, the proportional valves 36, 37 of the mast transition damping device 35 are located with the bypass lines 40, 42 and the stop valves 41, 43 located in them, in a valve block 45 of the mast transition damping device 35.

In FIG. 1, a mechanical line break safety device 60*a*, 60*b* is attached to each mast lift cylinder 11*a*, 11*b*. The line break safety device 60*a* attached to the mast lift cylinder 11*a* comprises a stop valve 62*a* that opens toward the mast lift cylinder 11*a*, for example a non-return valve, and a bypass line 63*a* with a throttle device 64*a* located in the bypass line 63*a*. The line break safety device 60*b* attached to the mast lift cylinder 11*b* comprises a stop valve 62*b*, for example a non-return valve, that opens toward the mast lift cylinder 11*b*, and a bypass line 63*b* with a throttle device 64*b* located in the bypass line 63*b*.

In FIG. 1, a mechanical line break safety valve device 60*c* is also attached to the free lift cylinder 10. The line break safety device 60*c* attached to the free lift cylinder 10 comprises a stop valve 62*c* that opens toward the free lift cylinder 10, for example a non-return valve, and a bypass line 63*c* with a throttle device 64*c* located in the bypass line 63*c*.

The electrically actuatable proportional valve 36 or 37 of the mast transition damping device 35, in the unactuated state, has a throttling connection 50 that effects a throttled volume flow, and can be actuated by an electrical control action toward an open position 51*a*.

In FIG. 1, the proportional valve 36 or 37 is actuated in the unactuated state into a normal position 51*b* which is provided with the throttling connection 50. The throttling connection 50 is, for example, formed by a throttling opening 52, for example a throttling boring, that acts in the normal position 51*b*. The normal position 51*b* is, therefore, realized as a throttling position.

Each proportional valve 36 or 37 is actuated by a spring device 55 into the normal position 51*b* and can be actuated toward the open position 51*a* by an electrical actuator device 56, such as a proportional magnet, for example. The actuator devices 56 are in connection with the electronic control device 25 for their control.

The hydraulic system 1 in FIG. 1, therefore, has a mast transition damping device 35 formed by the two electrically actuated proportional valves 36, 37, in combination with mechanical line break safety devices 60*a*, 60*b*, 60*c* on the free lift cylinder 10 and on the mast lift cylinders 11*a*, 11*b*.

In FIGS. 1 to 4 the electronic control device 25 is in communication with a sensor device not shown in any further detail, for example a lift height sensor or a lift height switch, with which the mast transitional range between free lift and mast lift can be determined.

The hydraulic system 1 illustrated in FIG. 1 functions as follows.

To raise the load handling means, which is done by actuating the control valve device 15 into the lifting position 15*b*, pressure medium is transported from the control valve device 15 into the consumer line 21 to the valve block 45 of the mast transition damping device 35. The proportional valve 36 of the mast transition damping device 35 is actuated into the open position 51*a* by the control device 25 so that pressure medium flows via the proportional valve 36 actuated into the open position 51*a* and the branch line 30 into the free lift cylinder 10. On account of the ratio of the surface area of the free lift cylinder 10 to the mast lift cylinders 11*a*, 11*b*, initially no pressure medium flows via the stop valve 43 into the mast lift cylinders 11*a*, 11*b*. As soon as the free lift cylinder 10 approaches the mast transition range, which is detected by the control device 25 by the sensor device, the electronic control device 25 begins to actuate the proportional valve 36 into the normal position 51*b* which is in the form of a throttling position. Consequently, the volume flow upstream of the proportional valve 36 is backed up to the extent that pressure medium flows from the control valve device 15 into the mast lift cylinders 11*a*, 11*b* via the opening stop valve 43.

To lower the load handling means, for which purpose the control valve device 15 is actuated into the lowering position 15*c*, pressure medium is transported out of the mast lift cylinders 11*a*, 11*b* via the branch line 31 into the valve block

45 of the mast transition damping device 35. The proportional valve 37 of the mast transition damping device 35 is actuated by the control device into the open position 51*a*, so that pressure medium flows out of the proportional valve 37 actuated into the open position 51*a* into the consumer line 21, and via the control valve device actuated into the lowering position 15*c* to the reservoir 19. On account of the ratio of the surface area of the free lift cylinder 10 to the mast lift cylinders 11*a*, 11*b*, initially no pressure medium flows out of the free lift cylinder 10 via the stop valve 41 to the control valve device 15. As soon the mast lift cylinders 11*a*, 11*b* approach the mast transition range, which is detected by the control device 25 by the sensor device, the electronic control device 15 begins to actuate the proportional valve 37 into the normal position 51*b* which is in the form of a throttling position. Consequently, the volume flow upstream of the proportional valve is backed up to the extent that pressure medium flows via the opening stop valve 41 out of the free lift cylinder 10 to the control valve device 15.

Figure 2:
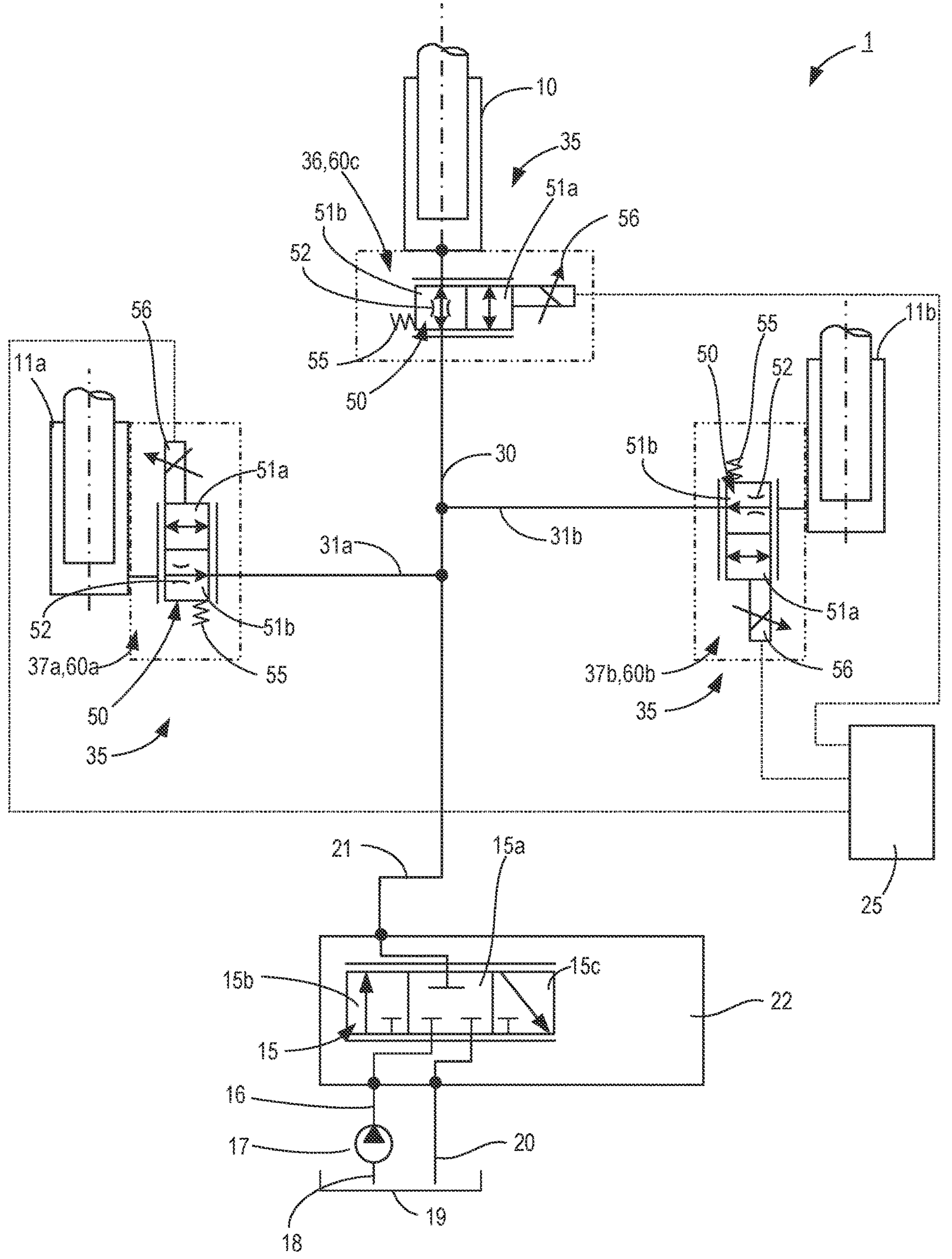
FIG. 2 is a schematic circuit diagram of a second embodiment of a hydraulic system according to the invention.

In FIG. 2, the free lift cylinder 10 is connected by a first branch line 30 that branches off the consumer line 21 with the control valve device 15, the first mast lift cylinder 11*a* is connected by a second branch line 31*a* that branches off the consumer line 21 with the control valve device 15, and the second mast lift cylinder 11*b* is connected by a third branch line 31*b* that branches off the consumer line 21 with the control valve device 15.

In FIG. 2, the mast transition damping device 35 has three electrically actuatable proportional valves 36, 37*a*, 37*b*, wherein in each branch line 30, 31*a*, 31*b* there is a proportional valve 36, 37*a*, 37*b* of the mast transition damping device 35. The first proportional valve 36 is located in the first branch line 30, the second proportional valve 37*a* is located in the second branch line 31*a* and the third proportional valve 37*b* is located in the third branch line 31*b*.

The proportional valve 36 is attached to the free lift cylinder 10, wherein the proportional valve 36 of the mast transition damping device 35 also has the function of an electrical line break safety device 60*c* of the free lift cylinder 10. The proportional valve 37*a* is attached to the mast lift cylinder 11*a*, wherein the proportional valve 37*a* of the mast to transition damping device 35 also has the function of an electrical line break safety device 60*a* of the mast lift cylinder 11*a*. The proportional valve 37*b* is attached to the mast lift cylinder 11*b*, wherein the proportional valve 37*b* of the mast transition damping device 35 also has the function of an electrical line break safety device 60*b* of the mast lift cylinder 11*b*.

The electrically actuatable proportional valves 36, 37*a*, 37*b* of the mast transition damping device 35, in the unactuated state, each have a throttling connection 50 that effects a throttled volume flow, and can be actuated toward an open position 51*a* in the event of an electrical control action.

In FIG. 2, the proportional valves 36, 37*a*, 37*b* are each actuated in the unactuated state into a normal position 51*b*, which is provided with the throttling connection 50. The throttling connection 50 is, for example, formed by a throttling opening 52, for example a throttling boring, that acts in the normal position 51*b*. The normal position 51*b* is therefore realized as a throttling position.

The proportional valve 36, 37*a*, 37*b* is actuated by a spring device 55 into the normal position 51*b* and can be actuated by an electrical actuator device 56, such as a proportional magnet, toward the open position 51*a*. The actuator devices 56 are in connection with the electronic control device 25 for driving.

Therefore, the hydraulic system 1 in FIG. 2 has a mast transition damping device 35 formed by the three electrically actuated proportional valves 36, 37*a*, 37*b*, in combination with electrical line break safety devices 60*a*, 60*b*, 60*c* on the free lift cylinder 10 and on the mast lift cylinders 11*a*, 11*b*, wherein the proportional valves 36, 37*a*, 37*b* of the mast transition damping device 35 attached to the corresponding lift cylinders each have the function of a line break safety device 60*a*, 60*b*, 60*c*.

The hydraulic system 1 in FIG. 2 functions as follows.

To raise the load handling means, for which purpose the control valve device 15 is actuated into the lifting position 15*b*, pressure medium is transported from the control valve device 15 into the consumer line 21 and into the branch lines 30, 31*a*, 31*b* connected to the consumer line 21. The proportional valve 36 of the mast transition damping device 35 is actuated into the open position 51*a* by the control device 25, so that pressure medium flows via the proportional valve 36 actuated into the open position 51*a* and the branch line 30 into the free lift cylinder 10. On account of the ratio of surface area of the free lift cylinder 10 to the mast lift cylinders 11*a*, 11*b*, initially no pressure medium flows into the mast lift cylinder 11*a*, 11*b*. As soon as the free lift cylinder 10 approaches the mast transition range, which is detected by the control device 25 by the sensor device, the electronic control device 25 begins to actuate the proportional valve 36 into the normal position 51*b* which is in the form of a throttling position, and to actuate the proportional valves 37*a*, 37*b* each into the open position 51*a*. Consequently, the volume flow upstream of the proportional valve 36 is backed up to the extent that pressure medium flows from the control valve device 15 into the mast lift cylinders 11*a*, 11*b* via the proportional valves 37*a*, 37*b* actuated toward the open position 51*a*.

To lower the load handling means, for which purpose the control valve device 15 is actuated into the lowering position 15*c*, the proportional valves 37*a*, 37*b* are each actuated by the control device 25 into the open position 51*a*, as a result of which pressure medium flows out of the mast lift cylinders 11*a*, 11*b* via the opened proportional valves 37*a*, 37*b* into the consumer line 21 and via the control valve device 15 actuated into the lowering position 15*c* to the reservoir 19. On account of the ratio of the surface area of the free lift cylinder 10 to the mast lift cylinders 11*a*, 11*b*, initially no pressure medium flows out of the free lift cylinder 10 and the proportional valve 36, which is in the normal position 51*b*, to the control valve device 15. As soon as the mast lift cylinder 11*a*, 11*b* approaches the mast transition range, which is detected by the control device 25 by the sensor device, the electronic control device 15 begins to actuate the proportional valves 37*a*, 37*b* into the normal position 51*b* which is in the form of a throttling position, and to actuate the proportional valve 36 into the open position 51*a*. Consequently, the volume flow upstream of the proportional valves 37*a*, 37*b* is backed up to the extent that the pressure in the consumer line 21 is progressively reduced, so that an increasing quantity of pressure fluid flows out of the free lift cylinder 10 via the proportional valve 36 actuated into the open position 51*a* to the control valve device 15.

The electrically actuated proportional valves 36, 37*a*, 37*b* in FIG. 2 also have the function of line break safety devices 60*a*, 60*b*, 60*c*. If no lifting or lowering of the load handling means is underway and the proportional valves 36, 37*a*, 37*b* are not actuated, the proportional valves 36, 37*a*, 37*b* are in the normal position 51*b* which is in the form of a throttling position. This corresponds to the state of an engaged line break safety device. In the event of a line break, therefore, the lowering speed of the load handling means is limited to an allowable value by the throttling connection 50 of the proportional valve 36, 37*a*, 37*b* acting in the normal position 51*b*.

If, during a lifting or lowering of the load handling means, an anomaly or a fault such as a line break is detected by the control device 25, the control device 25 actuates the proportional valves 36, 37*a*, 37*b* into the normal position 51*b* which is in the form of a throttling position. It is thereby ensured that the lowering speed of the load handling means is limited to an allowable value by the throttling connection 50 acting in the normal position 51*b*.

Figure 3:
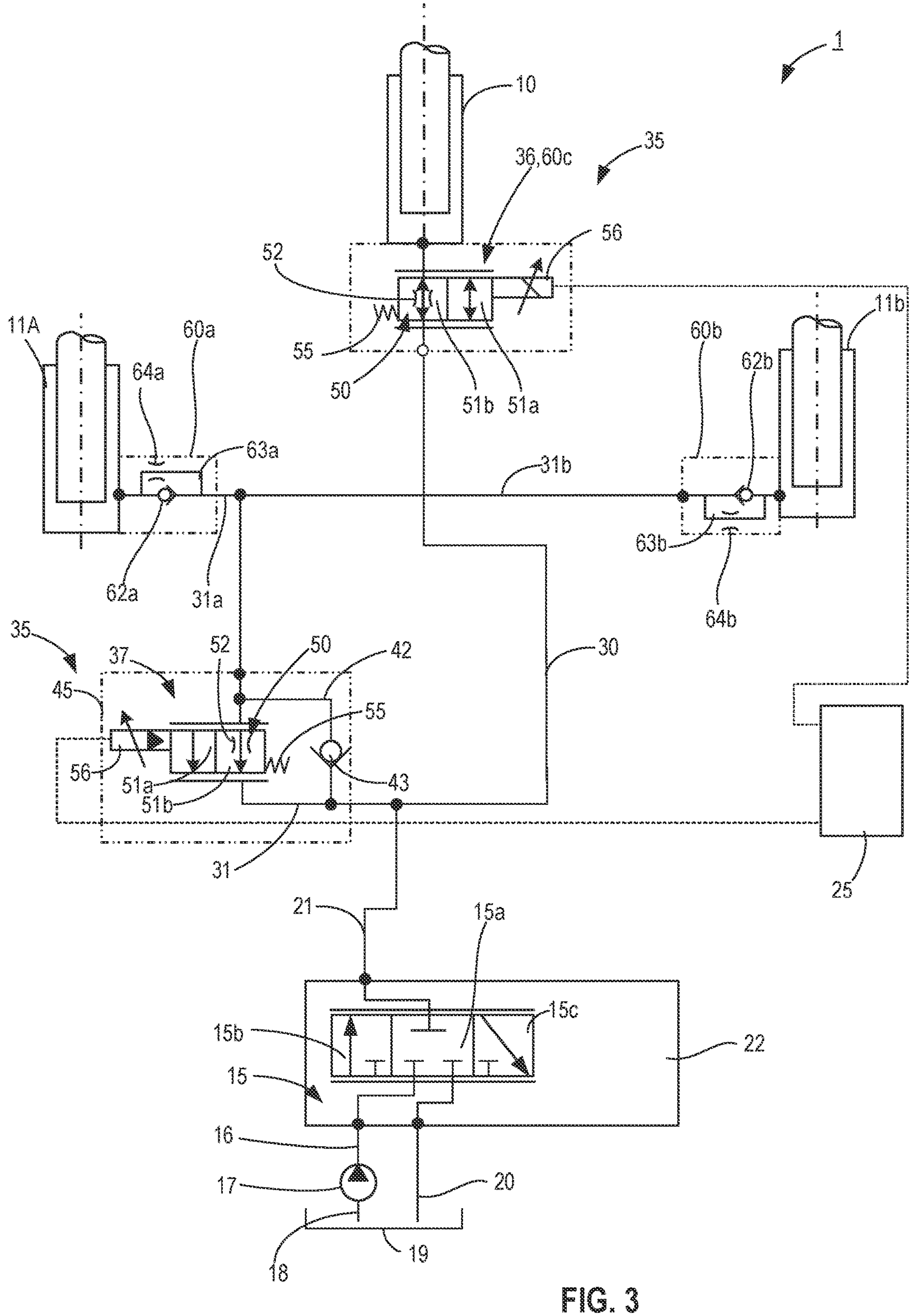
FIG. 3 is a schematic circuit diagram of a third embodiment of a hydraulic system according to the invention.

In FIG. 3, analogous to FIG. 1, the free lift cylinder 10 is connected by a first branch line 30 branching off the consumer line 21 with the control valve device 15, and the at least one mast lift cylinder 11*a*, 11*b* is connected by a second branch line 31 branching off the consumer line 21 with the control valve device 15. The branch line 31 is in connection by a first connecting line 31*a* with the mast lift cylinder 11*a* and by a first connecting line 31*b* with the mast lift cylinder 11*b*.

In FIG. 3, the mast transition damping device 35 has two electrically actuatable proportional valves 36, 37, wherein the first proportional valve 36 is located in the first branch line 30 and the second proportional valve 37 is located in the second branch line 31.

The proportional valve 36, analogous to FIG. 2, is attached to the free lift cylinder 10, wherein the proportional valve 36 of the mast transition damping device 35 also has the function of an electrical line break safety device 60*c* of the free lift cylinder 10.

Located on the second proportional valve 37, analogous to FIG. 1, is a bypass line 42 in which there is a stop valve 43, in particular a non-return valve, which opens toward the mast lift cylinders 11*a*, 11*b*.

In FIG. 3, analogous to FIG. 1, a mechanical line break safety device 60*a*, 60*b* is attached to each mast lift cylinder 11*a*, 11*b*. The line break safety device 60*a* attached to the mast lift cylinder 11*a* comprises a stop valve 62*a* that opens toward the mast lift cylinder 11*a*, for example a non-return valve, and a bypass line 63*a* with a throttle device 64*a* located in the bypass line 63*a*. The line break safety device 60*b* attached to the mast lift cylinder 11*b* comprises a stop valve 62*b*, for example a non-return valve that opens toward the mast lift cylinder 11*b*, and a bypass line 63*b* with a throttle device 64*b* located in the bypass line 63*b*.

The electrically actuatable proportional valve 36 or 37 of the mast transition damping device 35, in the unactuated state, has a throttling connection 50 that effects a throttled volume flow, and can be actuated by an electrical control action toward an open position 51*a*.

In FIG. 3, the proportional valve 36 or 37 is actuated in the unactuated state into a normal position 51*b* which is provided with the throttling connection 50. The throttling connection 50 is, for example, formed by a throttling opening 52, for example a throttling boring, that acts in the normal position 51*b*. The normal position 51*b* is therefore realized as a throttling position.

Each proportional valve 36 or 37 is actuated by a spring device 55 into the normal position 51*b* and can be actuated toward the open position 51*a* by an electrical actuator device 56, such as a proportional magnet, for example. The actuator device 56 is in connection with the electronic control device 25 for their actuation.

The hydraulic system 1 in FIG. 3, therefore, has a mast transition damping device 35 actuated by the two electrically actuated proportional valves 36, 37, in combination with the mechanical line break safety devices 60*a*, 60*b* on the mast lift cylinders 11*a*, 11*b* and with the electrical line break safety device 60*c* on the free lift cylinder 10.

The hydraulic system 1 in FIG. 3 functions as follows.

To raise the load handling means, which is done by actuating the control valve device 15 into the lifting position 15*b*, pressure medium is transported by the control valve device 15 into the consumer line 21 and the branch lines 30, 31. The proportional valve 36 of the mast transition damping device 35 located on the free lift cylinder 10 is actuated into the open position 51*a* by the control device 25, so that pressure medium flows into the free lift cylinder 10 via the proportional valve 36 actuated into the open position 51*a* and the branch line 30. On account of the ratio of the surface area of the free lift cylinder 10 to the mast lift cylinders 11*a*, 11*b*, initially no pressure medium flows via the stop valve 43 into the mast lift cylinders 11*a*, 11*b*. As soon as the free lift cylinder 10 approaches the mast transition range, which is detected by the control device 25 by the sensor device, the electronic control device 25 begins to actuate the proportional valve 36 located on the free lift cylinder 10 into the normal position 51*b* which is in the form of a throttling position. Consequently, the volume flow upstream of the proportional valve 36 is backed up to the extent that pressure medium flows from the control valve device 15 into the mast lift cylinders 11*a*, 11*b* via the opening stop valve 43.

To lower the load handling means, for which purpose the control valve device 15 is actuated into the lowering position 15*c*, the proportional valve 37 is actuated by the control device 25 into the open position 51*a*, as a result of which pressure medium flows out of the mast lift cylinders 11*a*, 11*b* via the opened proportional valve 37 into the consumer line 21 and via the control valve device 15 actuated into the lowering position 15*c* to the reservoir 19. On account of the surface area ratio of the free lift cylinder 10 to the mast lift cylinders 11*a*, 11*b*, initially no pressure medium flows out of the free lift cylinder 10 and the proportional valve 36, which is in the normal position 15*b* and which is attached to the free lift cylinder 10, to the control valve device 15. As soon as the mast lift cylinders 11*a*, 11*b* approach the mast transition range, which is detected by the control device 25 by the sensor device, the electronic control device 15 begins to actuate the proportional valve 37 into the normal position 51*b* which is in the form of a throttling position, and to actuate the proportional valve 36 located on the free lift cylinder 10 into the open position 51*a*. Consequently, the volume flow upstream of the proportional valve 37 is backed up to the extent that the pressure in the consumer line 21 progressively decreases, so that increasingly more pressure medium flows out of the free lift cylinder 10 via the proportional valve 36 actuated into the open position 51*a* to the control valve device 15.

Figure 4:
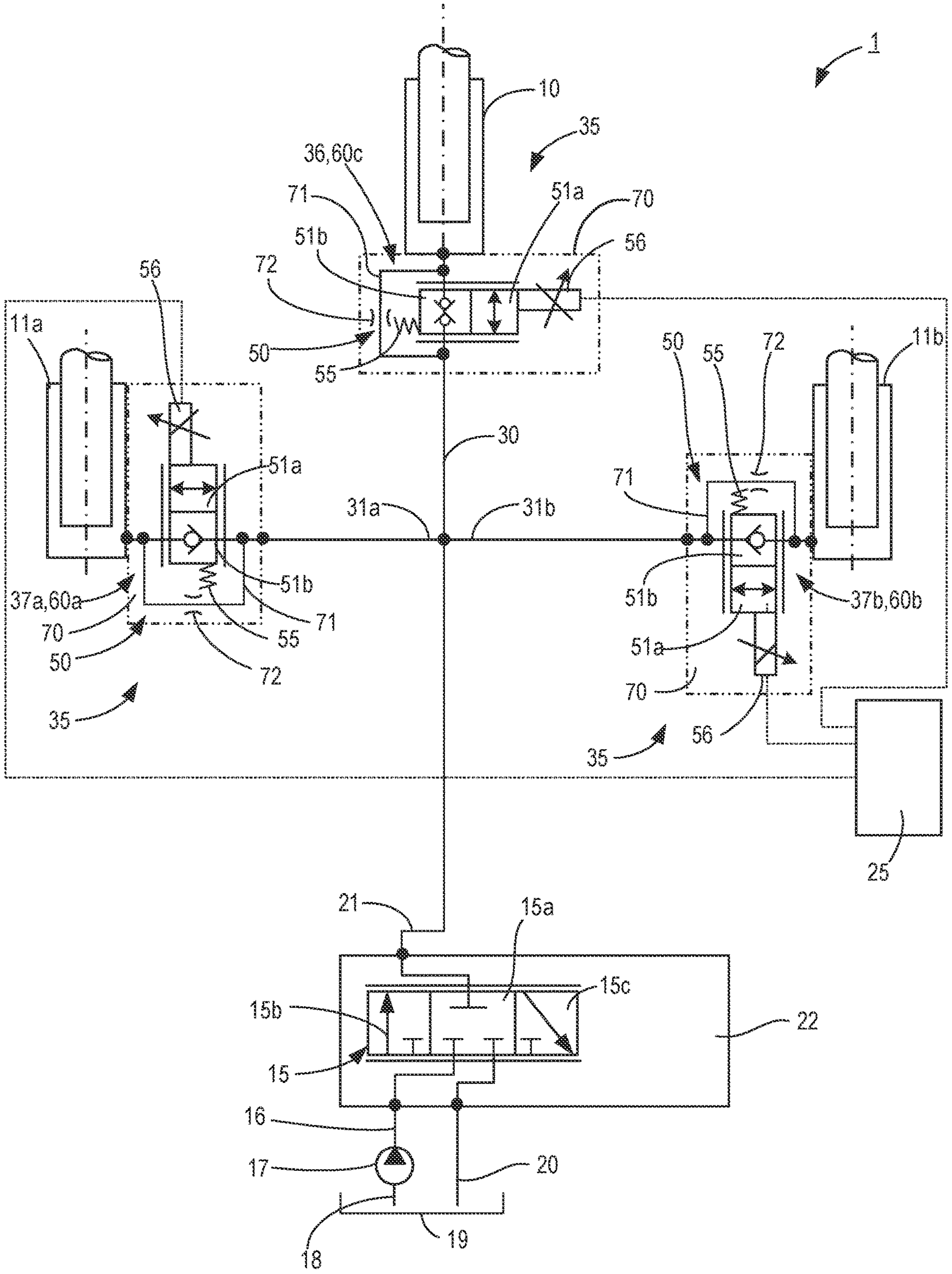
FIG. 4 is a schematic circuit diagram of a fourth embodiment of a hydraulic system according to the invention.

FIG. 4 illustrates a variant of FIG. 2.

In FIG. 4, the proportional valves 36, 37*a*, 37*b* each have a housing 70, into which the corresponding proportional valve 36, 37*a*, 37*b* is incorporated. Each proportional valve 36, 37*a*, 37*b* is actuated into a normal position 51*b* which is in the form of a closed position The throttling connection 50 of each proportional valve 36, 37*a*, 37*b* is formed by a bypass line 71 in which a throttling device 72 is located, which is realized in the housing 70 of the corresponding proportional valve 36, 37*a*, 37*b*.

Each proportional valve 36, 37*a*, 37*b* in FIG. 4 is actuated by a spring device 55 into the normal position 51*b* and can be actuated by an electrical actuator device 56, such as a proportional magnet, toward the open position 51*a*. The actuator devices 56 are in communication with the electronic control device 25 for their control.

In FIGS. 1 to 4, the corresponding proportional valves 36, 37*a*, 37*b* of the mast transition damping device 35 are actuated by the control device 25 so that during lifting operation of the load handling means, at the mast transition from the free lift into the mast lift, and in lowering operation of the load handling means, at the mast transition from the mast lift into the free lift, a uniform movement of the load handling means is always achieved without a change in speed or discontinuities in the mast transition.

For this purpose, during lifting operation the volume flow into the free lift cylinder 10 in the mast transition range is increasingly throttled by the corresponding actuation of the proportional valve 36 of the mast transition damping device 35, as a result of which a continuous decrease of the speed of extension of the free lift cylinder 10 is achieved. The proportional valves 37*a*, 37*b* are each actuated into the open position 51*a*. The dynamic pressure increased as a result of the throttling leads to a continuously faster extension of the mast lift cylinders 11*a*, 11*b*. The overlapping movement of the free lift cylinder 10 and of the mast lift cylinders 11*a*, 11*b* is preferably executed so that the lifting speed of the load remains constant in the mast transition range.

During lowering operation, for this purpose, by a corresponding control of the proportional valves 37*a*, 37*b* into the normal position 51*b* of the mast transition damping device 35, the volume flow out of the mast lift cylinders 11*a*, 11*b* in the mast transition range is progressively throttled, as a result of which a continuous decrease in the speed of retraction of the telescoping mast lift cylinders 11*a*, 11*b* is achieved. The proportional valve 36 is actuated into the open position 51*a*. The pressure in the consumer line 31 reduced by the throttling results in a continuously faster retraction of the free lift cylinder 10. The overlapping movement of the free lift cylinder 10 and of the mast lift cylinders 11*a*, 11*b* is preferably executed so that the lowering speed of the load remains constant in the mast transition range.

As a result of the mast transition damping, the free lift cylinder 10 and the mast lift cylinders 11*a*, 11*b* reach their mechanical terminal position at a very low speed both during lifting operation and during lowering operation.

The invention claimed is:

1. A hydraulic system for an industrial truck with a lifting frame, at least one telescoping mast that can be raised and lowered in a stationary mast, and a load handling device that can be raised and lowered in the telescoping mast, wherein the hydraulic system comprises:

a free lift cylinder for raising and lowering the load handling device; and at least one mast lift cylinder for raising and lowering the telescoping mast, wherein a control valve device is provided for the control of the lifting operation and the lowering operation of the free lift cylinder and of the mast lift cylinders, wherein a mast transition damping device is provided that comprises at least one electrically actuated proportional valve, wherein the proportional valve of the mast transition damping device, in an unactuated state, has a throttling connection that effects a throttled volume flow, and in the event of an electrical control action, can be actuated toward an open position, and wherein the proportional valve is located in a housing, wherein the proportional valve in the unactuated state is actuated into a normal position which is in the form of a closed position, and the throttling connection is formed by a bypass line in the housing of the proportional valve in which a throttling device is located.

2. The hydraulic system according to claim 1, wherein the proportional valve in the unactuated state is actuated into a normal position which is provided with the throttling connection.

3. The hydraulic system according to claim 1, wherein the free lift cylinder is connected by a first branch line with the control valve device, and the at least one mast lift cylinder is connected by a second branch line with the control valve device, wherein there is a first proportional valve of the mast transition damping device in the first branch line and a second proportional valve of the mast transition damping device in the second branch line.

4. The hydraulic system according to claim 3, wherein the first proportional valve is attached to the free lift cylinder and has the function of an electrical line break safety device.

5. The hydraulic system according to claim 1, wherein a mechanical line break safety device is attached to each mast lift cylinder.

6. The hydraulic system according to claim 1, wherein a mechanical line break safety device is attached to the free lift cylinder.

7. The hydraulic system according to claim 1, wherein the free lift cylinder is connected by a first branch line with the control valve device, and each mast lift cylinder is in communication by a connecting line with the control valve device, wherein a proportional valve of the mast transition damping device is located in each of the first branch line and the connecting line.

8. The hydraulic system according to claim 7, wherein attached to the free lift cylinder is a first proportional valve and/or attached to each mast lift cylinder is a second proportional valve, wherein the first and second proportional valves each have the function of an electrical line break safety device.

9. A hydraulic system for an industrial truck with a lifting frame, at least one telescoping mast that can be raised and lowered in a stationary mast, and a load handling device that can be raised and lowered in the telescoping mast, wherein the hydraulic system comprises:

a free lift cylinder for raising and lowering the load handling device; and at least one mast lift cylinder for raising and lowering the telescoping mast, wherein a control valve device is provided for the control of the lifting operation and the lowering operation of the free lift cylinder and of the mast lift cylinders, wherein a mast transition damping device is provided that comprises at least one electrically actuated proportional valve, wherein the proportional valve of the mast transition damping device, in an unactuated state, has a throttling connection that effects a throttled volume flow, and in the event of an electrical control action, can be actuated toward an open position, wherein the free lift cylinder is connected by a first branch line with the control valve device, and the at least one mast lift cylinder is connected by a second branch line with the control valve device, wherein there is a first proportional valve of the mast transition damping device in the first branch line and a second proportional valve of the mast transition damping device in the second branch line, and wherein located on the first proportional valve is a bypass line in which there is a stop valve that opens toward the control valve device.

10. The hydraulic system of claim 9, wherein the proportional valve in the unactuated state is actuated into a normal position which is provided with the throttling connection.

11. The hydraulic system of claim 9, wherein the proportional valve in the normal position is provided with a throttling opening.

12. The hydraulic system of claim 9, wherein located on the second proportional valve is a bypass line in which there is a stop valve that opens toward the at least one mast lift cylinder.

13. The hydraulic system of claim 9, wherein a mechanical line break safety device is attached to each mast lift cylinder.

14. The hydraulic system of claim 9, wherein a mechanical line break safety device is attached to the free lift cylinder.

* * * * *